(12) United States Patent
Abedini et al.

(10) Patent No.: US 11,910,483 B2
(45) Date of Patent: Feb. 20, 2024

(54) CLASSIFYING NODES BASED ON MOBILITY STATE

(71) Applicant: QUALCOMM Incorporated, San Diego, CA (US)

(72) Inventors: Navid Abedini, Basking Ridge, NJ (US); Jianghong Luo, Skillman, NJ (US); Wanshi Chen, San Diego, CA (US); Karl Georg Hampel, Hoboken, NJ (US); Luca Blessent, Whitehouse Station, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/199,124

(22) Filed: Mar. 11, 2021

(65) Prior Publication Data

US 2021/0289345 A1  Sep. 16, 2021

Related U.S. Application Data

(60) Provisional application No. 62/989,429, filed on Mar. 13, 2020.

(51) Int. Cl.
*H04W 36/32* (2009.01)
*H04W 8/22* (2009.01)
(Continued)

(52) U.S. Cl.
CPC ............. *H04W 8/22* (2013.01); *H04W 16/28* (2013.01); *H04W 24/08* (2013.01)

(58) Field of Classification Search
CPC ....... H04W 8/22; H04W 16/28; H04W 24/08; H04W 24/02; H04W 64/006; H04W 36/32; H04W 84/005; H04B 7/0695
See application file for complete search history.

(56) References Cited

U.S. PATENT DOCUMENTS

| 2009/0104911 A1* | 4/2009 | Watanabe | H04W 36/30 455/436 |
| 2015/0038180 A1* | 2/2015 | Quick, Jr. | H04W 36/32 455/458 |

(Continued)

FOREIGN PATENT DOCUMENTS

| CN | 110536433 A | * 12/2019 | |
| EP | 3313036 A1 | * 4/2018 | H04J 11/004 |

(Continued)

OTHER PUBLICATIONS

Huawei , Consideration on PHR, May 15-19, 2017, 3GPP TSG-RAN WG2#98, R2-1704612 (Year: 2017).*

(Continued)

*Primary Examiner* — Said M Elnoubi
(74) *Attorney, Agent, or Firm* — Harrity & Harrity, LLP

(57) ABSTRACT

Various aspects of the present disclosure generally relate to wireless communication. In some aspects, a wireless node may identify one or more parameters indicating a mobility of a served node relative to a serving node. The wireless node may classify the served node within a category, among a plurality of categories, based at least in part on the one or more parameters. In some aspects, the plurality of categories may include at least a first category for served nodes that have a low mobility relative to the serving node and a second category for served nodes that have a high mobility relative to the serving node. Numerous other aspects are provided.

30 Claims, 6 Drawing Sheets

(51) Int. Cl.
    *H04W 24/08*     (2009.01)
    *H04W 16/28*     (2009.01)

(56) References Cited

U.S. PATENT DOCUMENTS

| | | |
|---|---|---|
| 2017/0111954 A1 | 4/2017 | Wilhelmsson et al. |
| 2019/0335348 A1* | 10/2019 | Hou ........................ H04W 4/40 |
| 2021/0067295 A1* | 3/2021 | Sun ................... H04W 72/0446 |
| 2021/0345163 A1* | 11/2021 | Narasimha ............ H04W 72/20 |

FOREIGN PATENT DOCUMENTS

| | | | | |
|---|---|---|---|---|
| EP | 3737169 A1 * | 11/2020 | ............ | H04J 3/0673 |
| WO | 2019161989 A1 | 8/2019 | | |
| WO | WO-2019144356 A1 * | 8/2019 | ........ | H04W 36/0011 |

OTHER PUBLICATIONS

Huawei., et al., "Considerations on PHR", 3GPP Draft, 3GPP TSG-RAN WG2#98, R2-1704612 Considerations on PHR, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275163, 5 Pages, Retrieved from the Internet: URL: http://www.3gpp.org/ftp/Meetings_3GPP_SYNC/RAN2/Docs/ [retrieved on May 14, 2017], p. 3, Last paragraph, Figure 2.
International Search Report and Written Opinion—PCT/US2021/022147—ISAEPO—dated Aug. 11, 2021.
Partial International Search Report—PCT/US2021/022147—ISA/EPO—dated Jun. 21, 2021.

\* cited by examiner

CLASSIFYING NODES BASED ON MOBILITY STATE

CROSS-REFERENCE TO RELATED APPLICATION

This patent application claims priority to U.S. Provisional Patent Application No. 62/989,429, filed on Mar. 13, 2020, entitled "CLASSIFYING NODES BASED ON MOBILITY STATE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for classifying nodes based on mobility state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless node may include: identifying one or more parameters indicating a mobility of a served node relative to a serving node; and classifying the served node within a category, among a plurality of categories, based at least in part on the one or more parameters, wherein the plurality of categories include at least a first category for served nodes that have a low mobility relative to the serving node and a second category for served nodes that have a high mobility relative to the serving node.

In some aspects, a wireless node for wireless communication may include a memory and one or more processors, coupled to the memory, configured to: identify one or more parameters indicating a mobility of a served node relative to a serving node; and classify the served node within a category, among a plurality of categories, based at least in part on the one or more parameters, wherein the plurality of categories include at least a first category for served nodes that have a low mobility relative to the serving node and a second category for served nodes that have a high mobility relative to the serving node.

In some aspects, a non-transitory computer-readable medium may store one or more instructions for wireless communication. The one or more instructions, when executed by one or more processors of a wireless node, may cause the one or more processors to: identify one or more parameters indicating a mobility of a served node relative to a serving node; and classify the served node within a category, among a plurality of categories, based at least in part on the one or more parameters, wherein the plurality of categories include at least a first category for served nodes that have a low mobility relative to the serving node and a second category for served nodes that have a high mobility relative to the serving node.

In some aspects, an apparatus for wireless communication may include: means for identifying one or more parameters indicating a mobility of a served node relative to a serving node; and means for classifying the served node within a category, among a plurality of categories, based at least in part on the one or more parameters, wherein the plurality of categories include at least a first category for served nodes that have a low mobility relative to the serving node and a second category for served nodes that have a high mobility relative to the serving node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
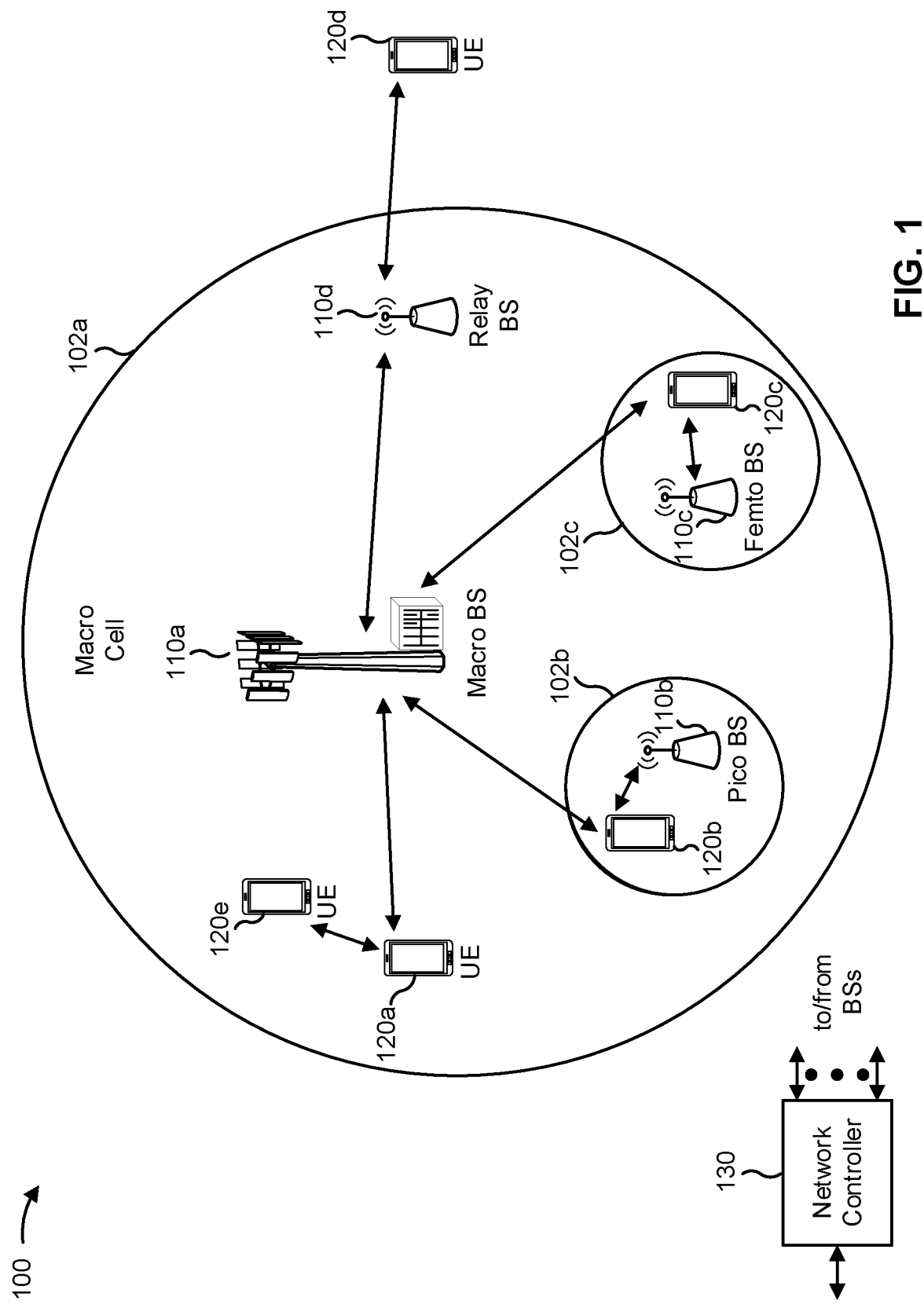
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
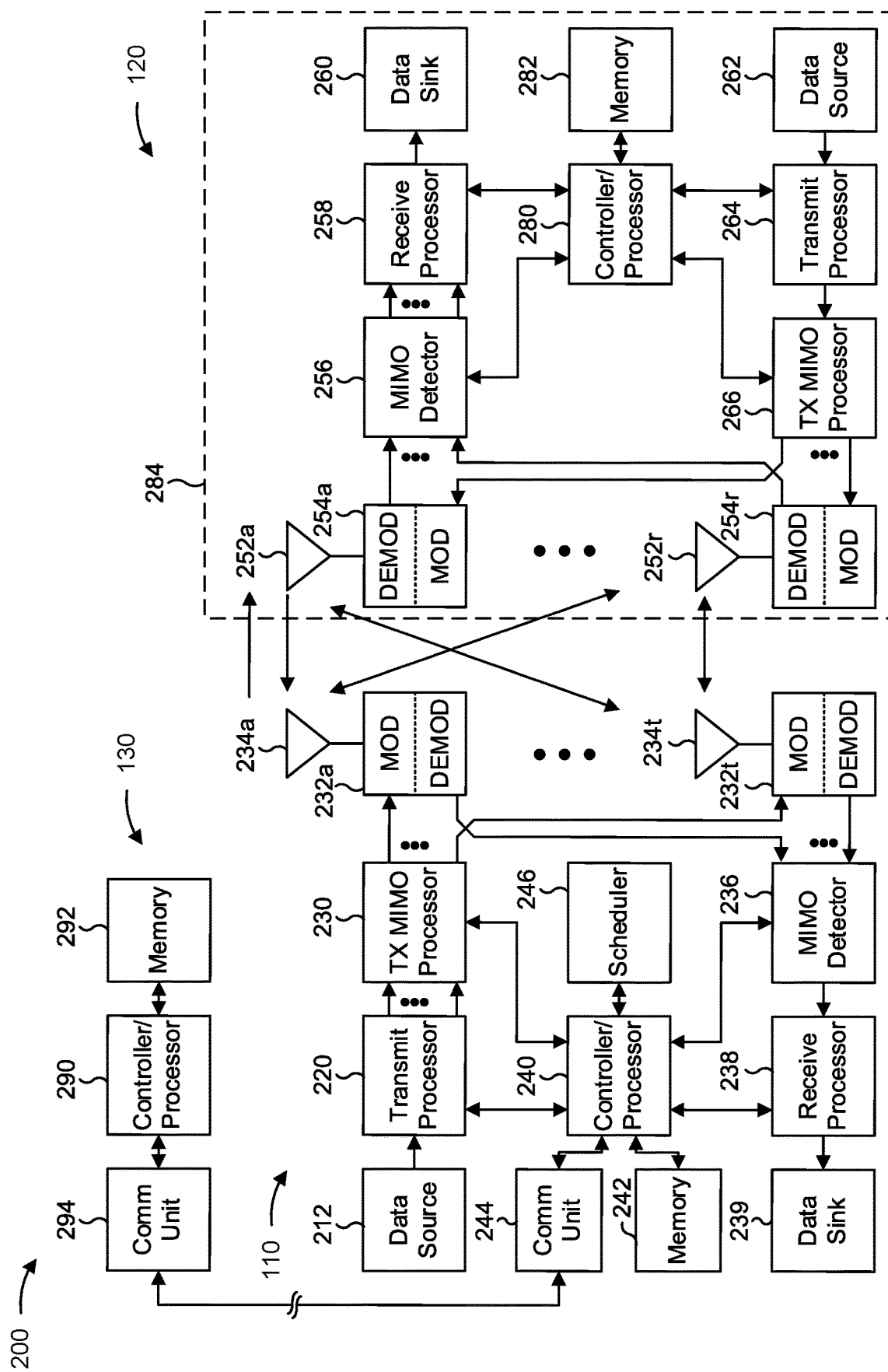
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-6).

Controller/processor 240 of base station 110, controller/processor 280 of UE 120, and/or any other component(s) of FIG. 2 may perform one or more techniques associated with classifying nodes based on mobility state, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, a wireless node may include means for identifying one or more parameters indicating a mobility of a served node relative to a serving node, means for classifying the served node within a category, among a plurality of categories, based at least in part on the one or more parameters, wherein the plurality of categories include at least a first category for served nodes that have a low mobility relative to the serving node and a second category for served nodes that have a high mobility relative to the serving node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. Additionally, or alternatively, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
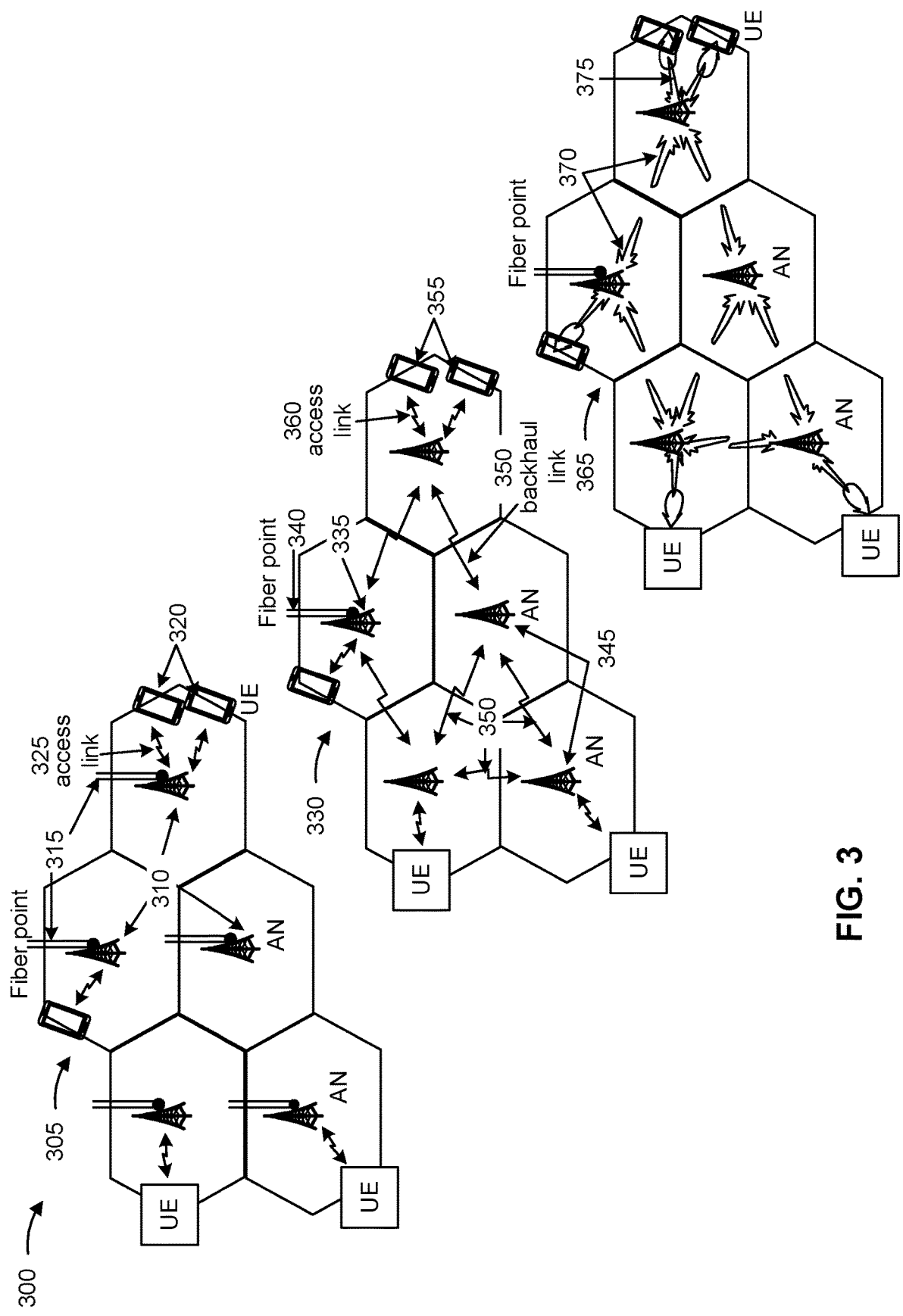
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic through one or more hops. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network, among other examples). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
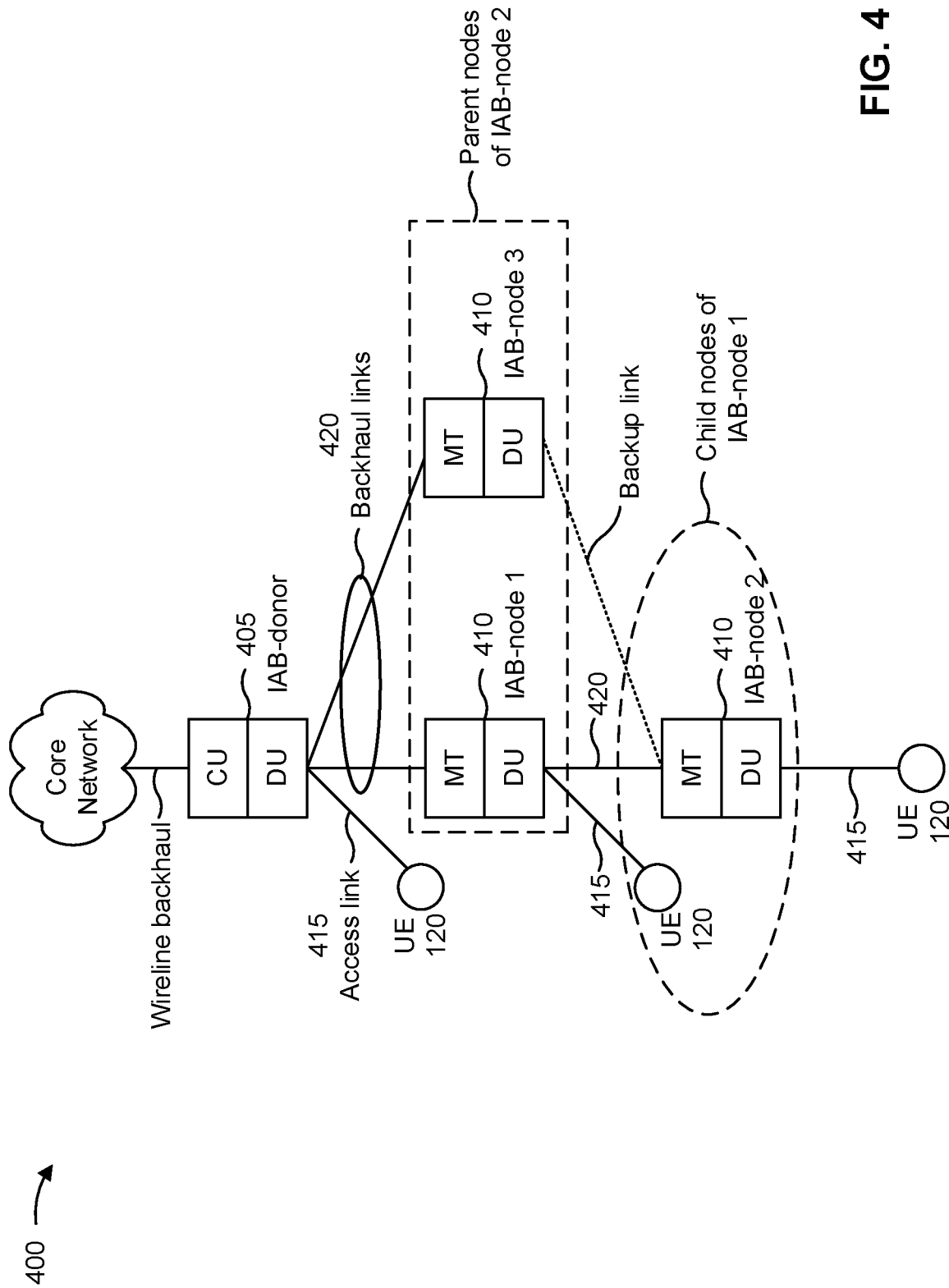
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or other suitable functions. The CU may configure a distributed unit (DU) of the IAB donor 405 and/or may configure one or more IAB nodes 410 (e.g., a mobile termination (MT) function and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, a Packet Data Convergence Protocol (PDCP) message, and/or another suitable message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (sometimes referred to as UE functions (UEF)) and may include DU functions (sometimes referred to as access node functions (ANF)) (e.g., radio link control (RLC) functions, medium access control (MAC) functions, physical layer (PHY) functions, and/or other suitable functions). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node, a wireless node, and/or variants thereof may refer to an IAB donor 405, an IAB node 410, a UE 120, and/or another suitable wireless communication device.

As indicated above, FIG. 4 is provided as an example. Other examples may differ from what is described with regard to FIG. 4.

As described above, in a typical IAB network, IAB nodes (e.g., non-anchor base stations) are stationary (or non-moving). Conversely, in a mobile IAB network, one or more IAB nodes may have capabilities to change locations or otherwise move around in the IAB network. In general, such IAB nodes may be referred to as mobile IAB nodes. For example, a mobile IAB node may be installed on a moving object (e.g., an automobile, a truck, a bus, a train, a taxi, a subway car, a motorcycle, a bicycle, a motorized personal conveyance, an elevator, a cable car, and/or a robot, among other examples). Additionally, or alternatively, a mobile IAB node may be provided on an aerial or orbiting device (e.g., an unmanned aerial vehicle or drone, an airplane, a helicopter, a satellite, a dirigible, and/or a balloon), and/or a marine vessel (e.g., a boat, a ferry, a passenger ship, and/or a freighter), among other examples. In a mobile IAB network, there may be a mix of stationary IAB nodes and mobile IAB nodes. In some cases, the mobile IAB nodes may be constrained to be "leaf" nodes in the mobile IAB network. That is, a mobile IAB node may be permitted to be only a last-hop IAB node, with only child access UEs connected to the mobile IAB node. In some other cases, a mobile IAB node may be permitted to have another IAB node as a child node.

In some examples, a mobile IAB node may provide an independently moving cell site. In such a case, a mobile IAB node (e.g., a communication device installed on a moving object, an aerial or orbiting device, and/or a marine vessel, among other examples) can provide a moving cell site for surrounding served nodes (e.g., a UE located inside and/or outside a vehicle containing a mobile IAB node in an urban area and/or an MT of a child IAB node, among other examples). Here, the serving mobile IAB node may move relatively randomly, at relatively low speeds (e.g., at urban city speed), and/or over a relatively large distance, among other examples. In this case, the mobility of a given served node may be determined relative to the serving mobile IAB node. For example, in some cases, a served node may move independently from the serving mobile IAB node (e.g., movement of the served node is not predictable from movement of the serving mobile IAB node) even though the movement of the served node may be at a speed similar to the serving mobile IAB node (e.g., a served UE in a vehicle traveling on the same roadway as a serving mobile IAB node).

In some other examples, a mobile IAB node may provide a jointly moving cell site (e.g., on a high-speed train). In such a case, a mobile IAB node may be mounted on the moving cell site (e.g., on top of a high-speed train) in order to serve other nodes on or in the moving cell site (e.g., UEs belonging to users traveling inside the high-speed train). Here, the mobility of the serving mobile IAB node may be predictable, at relatively high speeds, and over a large distance. In this use case, served nodes on or in the moving cell site may move jointly with the serving mobile IAB node (e.g., movement of the served node is generally predictable according to the movement of the serving mobile IAB node).

In some other examples, a mobile IAB node may facilitate a platoon, when, for example, a loose group of nodes served by the mobile IAB node is generally moving together. In such a case, a single IAB node may provide network connectivity for nearby nodes. For example, a mobile IAB node mounted on a first vehicle driving on a freeway may provide network connectivity for UEs, MTs of child IAB nodes, and/or other nodes in the first vehicle as well as UEs, MTs of child IAB nodes, and/or other nodes in other vehicles driving on the freeway in the same direction and at a similar speed. In such cases, the serving mobile IAB node may connect to the network, while other vehicles may be configured to act as respective child nodes. Here, the serving mobile IAB node may move with local predictability, at a relatively constant speed, and over a relatively large distance. Further, the served nodes may move jointly with the mobile IAB node.

Accordingly, in a mobile network (e.g., a mobile IAB network), a served node may generally have a mobility state that is determined with respect to a given serving node. For example, with respect to a mobile serving node providing a moving cell site, a served node camping on the moving cell site or otherwise receiving service through the moving cell site may have a low mobility (or may be considered relatively stationary) with respect to the mobile serving node in cases where the served node is located inside the mobile serving node, co-located with the mobile serving node, and/or moving together with the mobile serving node, among other examples (e.g., the served node belongs to a passenger traveling within a train acting as a mobile cell site). Alternatively, the served node may have a relatively high mobility with respect to the mobile serving node in cases where the served node is located outside the mobile serving node, and/or moving independently from the mobile serving node, among other examples (e.g., the served node is a UE that belongs to a pedestrian traveling on sidewalk as a bus acting as a mobile serving node drives by). Furthermore, in some cases, the mobility state associated with a given served node may change or transition from one state to another (e.g., a UE traveling inside a train acting as a mobile IAB node may change from having a low mobility relative to the mobile IAB node to having a high mobility relative to the mobile IAB node upon exiting the train, or vice versa). Furthermore, similar issues may apply when determining the relative mobility of a served node and a stationary serving node (e.g., stationary or slow-moving UEs may have a low mobility relative to the serving node, while other UEs moving at a high-speed may have a high mobility relative to the serving node, and other UEs may fall elsewhere along a spectrum from stationary to highly mobile relative to the serving node).

Accordingly, in a wireless network, such as a mobile IAB network, the mobility state of a served node (e.g., a UE and/or an MT of a child IAB node) relative to a serving node (e.g., a DU of a child IAB node, a DU of an IAB donor, and/or a CU of an IAB donor) can have a significant impact on operation of the wireless network. For example, served nodes that have different mobility states may experience different wireless environments (e.g., different Doppler characteristics and/or faster variation in multipath propagation characteristics, among other examples), which can impact performance for the served nodes as well as various network-related operations (e.g., resource management, local scheduling, beam management, beam tracking, synchronization tracking, positioning, access, and/or paging, among other examples). For example, a served node attempting to camp on a mobile serving node traveling at a high speed may need to perform frequent handovers, which may degrade performance for the served node, increase network overhead, and/or the like. Accordingly, knowledge of the mobility state of a given served node relative to a given serving node (which may be mobile or stationary) may facilitate efficient and acceptable performance for served nodes and serving nodes in the wireless network.

Some aspects described herein provide techniques and apparatuses for classifying a served node in a wireless network according to a relative mobility between the served node and a serving node. For example, multiple categories may be defined for served nodes that have different relative mobilities with respect to a serving node. In some aspects, the categories may include at least a category for served nodes that have a low mobility relative to the serving node (e.g., served nodes that generally have a static position relative to a position of the serving node and/or are moving in the same direction and at the same speed as the serving node). Furthermore, the categories may include another category for served nodes that have a high mobility relative to the serving node (e.g., served nodes for which a change in distance or direction to the serving node exceeds a threshold over a time period and/or served nodes that move independently such as in different directions and/or at different speeds from the serving node). Additionally, or alternatively, the categories may include categories for served nodes that are stationary relative to the serving node, have a moderate mobility relative to the serving node, and/or the like, or the categories may be defined along a spectrum from stationary to highly mobile or at any other suitable level of granularity.

As used herein, the terms "mobility," "mobility state," "relative mobility," and/or variants thereof may be used interchangeably to refer to a state and/or degree of motion or movement that a stationary or mobile object, device, and/or node is presently experiencing (or is determined or estimated to be experiencing) in two dimensions and/or in three dimensions with respect to the state and/or degree of motion or movement associated with another stationary or mobile object, device, and/or node. Furthermore, while some techniques are described herein in terms of mobility aspects such as speed, direction of movement, and/or other motion-related characteristics, it will be appreciated that the same or similar techniques may be applied using other relative aspects of mobility, such as velocity, acceleration, deceleration, elevation, altitude, depression, height, depth, attitude, and/or rotation, among other examples.

In some aspects, the served node may be classified into the appropriate category according to one or more parameters that indicate the mobility state associated with the served node relative to the serving node. For example, in some aspects, the one or more parameters may include measurements that relate to managing beams used to communicate with the served node, uplink channel measurements and/or downlink channel measurements, uplink and/or downlink reception timing, a position of the served node, a duration of time that the served node has been camped on the serving node, radio resource management (RRM) measurements reported by the served node and/or other nodes in the wireless network, and/or the like. Furthermore, as described herein, any suitable entity in a wireless network may classify the served node. For example, the served node may be classified by the serving node (e.g., a DU of an IAB node), another network node (e.g., a CU of an IAB donor), the served node (e.g., a UE or an MT of a child IAB node), and/or other served nodes. In this case, one or more entities in the wireless network may have access to different permutations of the one or more parameters that indicate the mobility state associated with the served node relative to the serving node, and an entity that attempts to classify the served node may signal the classification to other entities in the wireless network. In this way, one or more network nodes may determine the mobility state of the served node, which may enable the one or more network nodes to adopt different configurations to communicate with different sets of served nodes according to respective mobility states and thereby improve performance for the served nodes and the network nodes.

Figure 5:
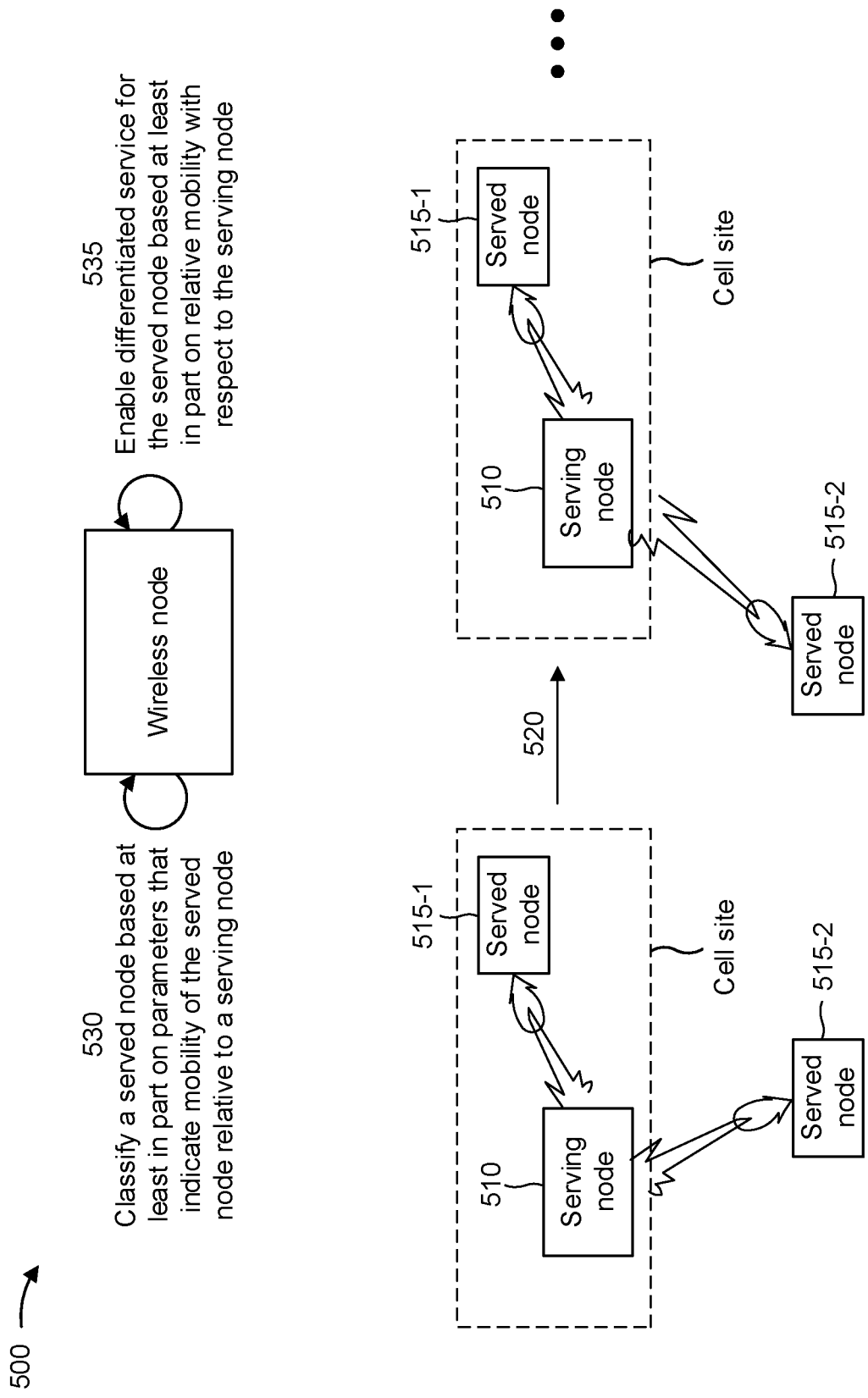
FIG. 5 is a diagram illustrating an example of classifying nodes based on mobility state, in accordance with the present disclosure.

FIG. 5 is a diagram illustrating an example 500 of classifying nodes based on mobility state, in accordance with the present disclosure. As shown in FIG. 5, example 500 includes a serving node 510 that may provide wireless service at a cell site and a set of served nodes 515-1, 515-2 that are under the coverage of the serving node 510 and receiving wireless service from the serving node 510. For example, in some aspects, the serving node 510 may correspond to a base station (e.g., base station 110 and/or base station 310), and the served nodes 515 may each correspond to a UE (e.g., UE 120 and/or UE 320). Additionally, or alternatively, in some aspects, the serving node 510 may correspond to a DU associated with an IAB donor (e.g., IAB donor 405), a DU associated with an IAB node (e.g., IAB node 410), and/or another suitable DU, and the served nodes 515 may correspond to a UE (e.g., UE 120) that communicates with a DU associated with an IAB donor or a DU associated with an IAB node over an access link (e.g., access link 415), an MT of a child IAB node that communicates with a DU associated with a parent IAB donor or a DU associated with an IAB donor over a backhaul link (e.g., backhaul link 420), and/or another suitable device that communicates with a DU over a wireless link.

Furthermore, as shown in FIG. 5, example 500 includes a wireless node that may classify the served nodes 515-1, 515-2 into a category based at least in part on respective mobilities of the served nodes 515-1, 515-2 relative to the serving node 510. For example, as described above, the cell site associated with the serving node 510 may be a mobile cell site that may move according to a random or predictable pattern, at a high, moderate, and/or low speed, among other examples, and the relative mobilities of the served nodes 515-1, 515-2 may depend on whether the served nodes 515-1, 515-2 are moving together with the serving node 510, moving independently of the serving node 510, and/or the like. For example, in cases where the cell site associated with the serving node 510 is a mobile cell site, the mobile cell site may be a vehicle (e.g., a bus, a taxi, a train, and/or another suitable vehicle), the served node 515-1 may be a passenger device located within the mobile cell site such that the served node 515-1 and the serving node 510 are co-located and move together. Furthermore, in the example 500 illustrated in FIG. 5, the served node 515-2 may be a pedestrian device located outside the mobile cell site such that the served node 515-2 and the serving node 510 are not co-located and move independently from one another. For example, as shown by reference number 520, the mobile cell site may change positions, after which a distance and direction between the served node 515-1 and the serving node 510 remains relatively unchanged. However, because the served node 515-2 moves independently from the serving node 510, the distance and/or direction between the served node 515-2 and the serving node 510 changes after the mobile cell site changes position. Accordingly, in this case, the served node 515-1 may have a low mobility relative to the serving node 510, and the served node 515-2 may have a high mobility relative to the serving node 510.

Additionally, or alternatively, in some aspects, the cell site associated with the serving node 510 may be a stationary cell site that has a fixed position, in which case the relative mobilities of the served nodes 515-1, 515-2 may depend on movement of the served nodes 515-1, 515-2 independent of the serving node 510. For example, as shown by reference number 520, the served node 515-1 may have a relatively fixed position with respect to the serving node 510 over time, and a distance and/or direction between the served node 515-2 and the serving node 510 changes after the served node 515-2 changes position. Accordingly, in this case, the served node 515-1 may similarly have a low mobility relative to the serving node 510, and the served node 515-2 may similarly have a high mobility relative to the serving node 510, although in the case of a stationary cell site the relative mobility is generally dependent only on the mobility of the served nodes 515-1, 515-2.

In some aspects, as described above, a wireless node may classify the served nodes 515-1, 515-2 into a category based at least in part on respective mobilities of the served nodes 515-1, 515-2 relative to the serving node 510. For example, the wireless node may correspond to the served nodes 515-1, 515-2 the serving node 510, a CU associated with the serving node 510, and/or another suitable node. As described herein, the wireless node may generally classify the served nodes 515-1, 515-2 into a particular category, among multiple categories that include at least a first category for served nodes that have a low mobility relative to the serving node (e.g., served nodes that generally have a static position relative to a position of the serving node, are moving in the same direction and at the same speed as the serving node, and/or the like) and a second category for served nodes that have a high mobility relative to the serving node (e.g., served nodes for which a distance or direction to the serving node changes over time, served nodes that move independently such as in different directions and/or at different speeds from the serving node, and/or the like). Accordingly, while some aspects may be described herein in terms of two categories based on low or high relative mobilities, it will be appreciated that the multiple categories may include additional categories for served nodes that are stationary relative to the serving node, have a moderate mobility relative to the serving node, or the like, or the categories may be defined along a spectrum from stationary to highly mobile or at any other suitable level of granularity.

As shown in FIG. 5, and by reference number 530, the wireless node may classify a served node (e.g., served node 515-1, served node 515-2, and/or the like) based at least in part on one or more parameters that indicate a mobility of the served node relative to a serving node (e.g., serving node 510). For example, in some aspects, the one or more parameters may include measurements that relate to managing beams used to communicate with the served node, uplink channel measurements and/or downlink channel measurements, uplink and/or downlink reception timing, a position of the served node, a duration of time that the served node has been camped on the serving node, and/or RRM measurements reported by the served node and/or other nodes in the wireless network, among other examples. Furthermore, in some aspects, the wireless node may determine the mobility of the served node relative to the serving node (and thus the category in which to classify the serving node) according to changes to one or more of the parameters over time.

For example, in cases where the serving node and the served node communicate using directional beamformed communications, the serving node and the served node may communicate on an uplink using a first beam pair link (BPL) that includes an uplink receive beam at the serving node and a corresponding uplink transmit beam at the served node. In addition, the serving node and the served node may communicate on a downlink using a second BPL that includes a downlink transmit beam at the serving node and a corresponding downlink receive beam at the served node. Accordingly, in some aspects, the one or more parameters may include one or more beam-related measurements, such as a beam-specific RSRP, a beam-specific RSRQ, a beam-specific signal-to-interference-plus-noise ratio (SINR), and/or a beam-specific RSSI, among other examples.

In some aspects, the wireless node may record or otherwise track the beam-related measurements to determine whether and/or a degree to which a wireless environment associated with the served node changes over time, and thereby identify the category in which to classify the served node. For example, in some aspects, the served node may be classified as having a low mobility relative to the serving node in cases where the beam-related measurements are relatively stable over time, or the served node may be classified as having a high mobility relative to the serving node in cases where the beam-related measurements change relatively rapidly over a given time period. In another example, served nodes that have a low mobility relative to the serving node may generally be expected to have a semi-static BPL configuration or BPLs for the served nodes that have a low mobility relative to the serving node may change over a quantity of BPL candidates that is less than or equal to a threshold (e.g., because an angle between the served node and the serving node does not change or changes a small amount over time). In contrast, served nodes that have a high mobility relative to the serving node may be more likely to experience faster changes in a wireless environment (e.g., changes to a line-of-sight path from the served node to the serving node, changes to multipath propagation characteristics, and/or the like), and served nodes in the high mobility category may be expected to have a dynamic BPL configuration or BPLs that change over a larger quantity of BPL candidates. Accordingly, in some aspects, the wireless node may classify the served node into a particular mobility category (e.g., low mobility, high mobility, moderate mobility, and/or stationary, among other examples) according to changes over time to the BPL configuration used to serve the served node.

Additionally, or alternatively, the one or more parameters may include one or more uplink and/or downlink channel measurements. For example, in some aspects, the uplink and/or downlink channel measurements may include an RSRP, an RSRQ, an SINR, an RSSI, a CQI, and/or other suitable measurements that may be based at least in part on one or more omnidirectional uplink and/or downlink transmissions between the served node and the serving node. Accordingly, in some aspects, the wireless node may record or otherwise track the uplink and/or downlink channel measurements to determine whether and/or a degree to which a wireless environment associated with the served node changes over time and thereby identify the category in which to classify the served node. For example, the served node may be classified as having a low mobility relative to the serving node in cases where the uplink and/or downlink channel measurements are relatively stable over time, or the served node may be classified as having a high mobility relative to the serving node in cases where the uplink and/or downlink channel measurements change relatively rapidly over a given time period. For example, changes in the uplink and/or downlink channel measurements over time may indicate whether and/or a degree to which a distance and/or angle between the serving node and the served node changes over time, such that the wireless node may classify the served node into a particular mobility category according to how the uplink and/or downlink channel measurements vary over time.

In another example, the one or more parameters may include an uplink receive timing, a downlink receive timing, and/or other suitable parameters. For example, changes in the uplink and/or downlink receive timing over time may generally indicate whether and/or a degree to which a distance and/or angle between the serving node and the served node is changing over time (e.g., a propagation delay in the uplink and/or downlink receive timing may decrease as the distance between the serving node and the served node decreases, or the propagation delay may increase as the distance between the serving node and the served node increases). Accordingly, in some aspects, the wireless node may classify the served node into a particular mobility category according to how the uplink receive timing and/or the downlink receive timing for communications between the serving node and the served node change over time.

In another example, the one or more parameters may include a position associated with the served node, which may be measured by the serving node, measured by another network node (e.g., a CU of an IAB donor), and/or measured and/or reported by the served node, among other examples. For example, in some aspects, the position may include a latitude, longitude, and elevation (or x-y-z coordinates) of the served node and/or the serving node, which may be determined using global navigation satellite system (GNSS) positioning techniques, cellular positioning techniques (e.g., using pseudolites, observed time difference of arrival (OT-DOA), and/or positioning reference signals), inertial positioning techniques, and/or other suitable techniques. Accordingly, a distance and/or angle between the serving node and the served node may be determined based on a difference between the position of the served node and the position of the serving node, and changes in the distance and/or angle between the serving node and the served node over time may generally indicate whether the served node is co-located and moving together with the served node (e.g., has a low mobility relative to the serving node) or moving independently from the served node (e.g., has a high mobility relative to the serving node). Accordingly, in some aspects, the wireless node may classify the served node into a particular mobility category according to how the distance and/or angle between the serving node and the served node change over time, which may be determined by tracking changes to the position(s) of the serving node and/or the served node over time.

In another example, the one or more parameters may include a duration of time that the served node has been camping on a cell provided by the serving node. For example, the served node may be determined to be co-located and moving together with the served node (e.g., has a low mobility relative to the serving node) in cases where the served node has been camped on a cell provided by the serving node for a long duration of time, or the served node may be determined to be moving independently from the served node (e.g., has a high mobility relative to the serving node) in cases where the served node has been camped on a cell provided by the serving node for a short duration and/or where the served node has been performing frequent handovers, among other examples. Accordingly, in some aspects, the wireless node may classify the served node into a particular mobility category according to the duration of time that indicates how long the served node has been camping on the cell provided by the serving node.

In another example, the one or more parameters may include RRM measurements that are obtained and/or reported by the served node and/or other nodes in the network based at least in part on signals communicated between the served node and the other nodes in the network. For example, the served node may transmit signals to and/or receive signals from other served nodes and/or other serving nodes, and the served node may obtain RRM measurements (e.g., beam directions, RSRP measurements, RSSI measurements, and/or other suitable measurements) associated with the signals transmitted to and/or received from the other nodes. Accordingly, changes in the RRM measurements may generally indicate whether and/or a degree to which the served node is moving towards and/or away from the other nodes in the network, which may indicate a mobility of the served node relative to the serving node. For example, changes in the RRM measurements may indicate that the served node and the serving node are co-located or moving together in cases where the distance and/or angle between the served node and another node is changing at the same rate as the distance and/or angle between the serving node and the other node. In contrast, changes in the RRM measurements may indicate that the served node and the serving node are moving independently in cases where the distance and/or angle between the served node, the serving node, and the other node are changing at different rates. Accordingly, in some aspects, the wireless node may classify the served node into a particular mobility category according to how the RRM measurements that are obtained and/or reported by the served node and/or other nodes in the network change over time.

As further shown in FIG. 5, and by reference number 535, the wireless node may enable differentiated service for the served node based at least in part on the relative mobility of the served node with respect to the serving node. For example, in some aspects, the wireless node may transmit signaling to other nodes in the network to indicate the category in which the served node is classified, and the signaling may further indicate a confidence level associated with the classification of the served node. For example, as described above, one or more entities in the wireless network may have access to different permutations of the one or more parameters that indicate the mobility state associated with the served node relative to the serving node. Accordingly, the wireless node may classify the served node and may signal the classification to other entities in the wireless network such that the serving node may adopt an appropriate configuration to communicate with the served node according to the mobility state of the served node. Furthermore, the wireless node may receive signaling indicating the category in which one or more other nodes classified the served nodes, which may similarly include a confidence level associated with the classification, and the wireless node may determine the category in which to classify the served node based at least in part on the signaling received from the one or more other nodes.

In some aspects, the wireless node that classifies the served node may be the serving node (e.g., a DU that communicates with the served node on an access link, a DU that communicates with an MT of a child IAB node on a backhaul link, and/or a CU of an IAB donor that controls and/or configures an entire IAB network). In such cases, the wireless (serving) node may enable the differentiated service by communicating with the served node to provide wireless service to the served node according to the mobility state of the served node. For example, in some aspects, the wireless (serving) node may prioritize wireless service for served nodes that have a low mobility relative to the wireless (serving) node, include more pilots (e.g., demodulation reference signals) in uplink and downlink communications for served nodes that have a high mobility relative to the wireless (serving) node to enable faster (e.g., more frequent) beam management and guarantee performance for served nodes experiencing faster variations in wireless propagation conditions, and/or the like.

As indicated above, FIG. 5 is provided as an example. Other examples may differ from what is described with respect to FIG. 5.

Figure 6:
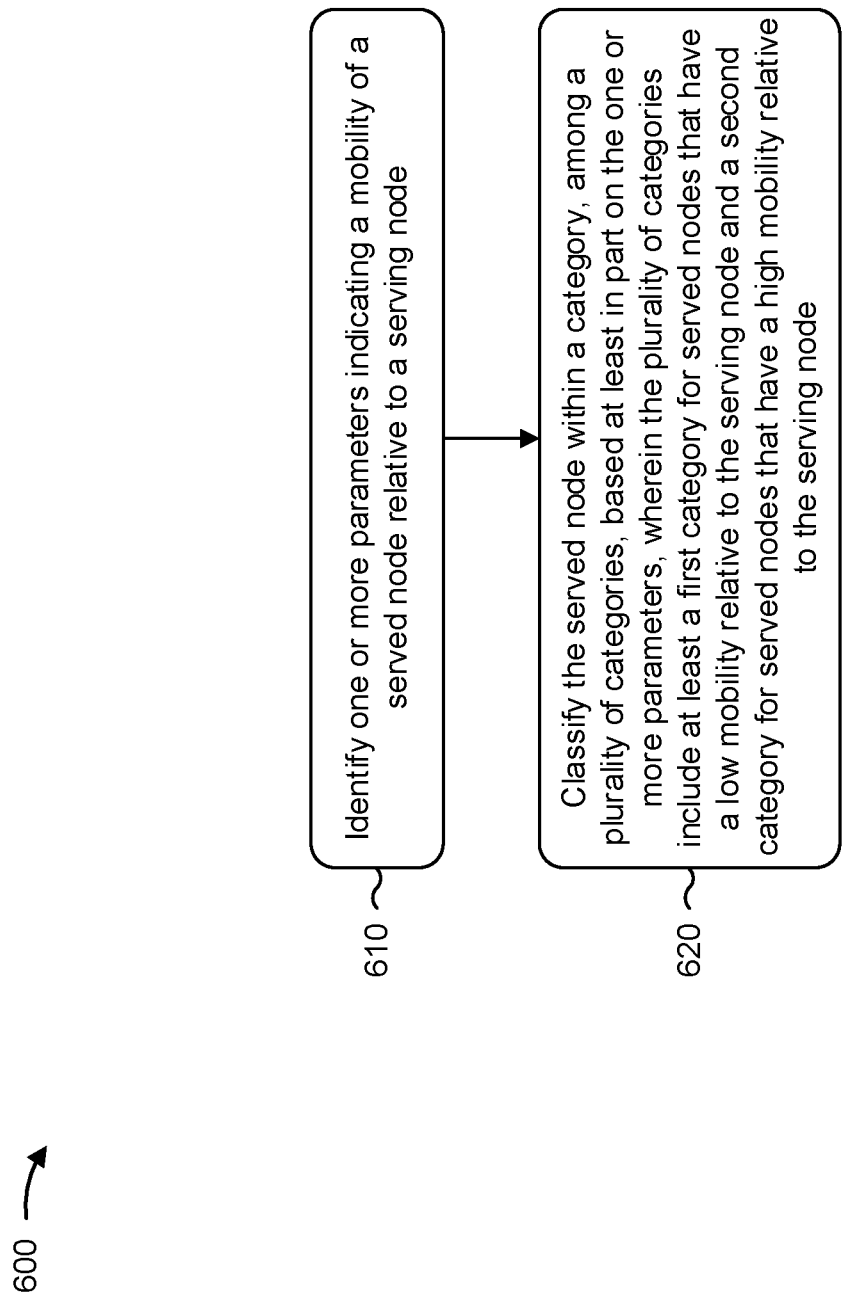
FIG. 6 is a diagram illustrating an example process performed, for example, by a wireless node, in accordance with the present disclosure.

FIG. 6 is a diagram illustrating an example process 600 performed, for example, by a wireless node, in accordance with the present disclosure. Example process 600 is an example where a wireless node (e.g., base station 110, UE 120, base station 310, UE 320, IAB donor 405, IAB node 410, serving node 510, served node 515-1, 515-2, and/or the like) performs operations associated with classifying nodes based on mobility state.

As shown in FIG. 6, in some aspects, process 600 may include identifying one or more parameters indicating a mobility of a served node relative to a serving node (block 610). For example, the wireless node may identify (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) one or more parameters indicating a mobility of a served node relative to a serving node, as described above.

As further shown in FIG. 6, in some aspects, process 600 may include classifying the served node within a category, among a plurality of categories, based at least in part on the one or more parameters, wherein the plurality of categories include at least a first category for served nodes that have a low mobility relative to the serving node and a second category for served nodes that have a high mobility relative to the serving node (block 620). For example, the wireless node may classify (e.g., using controller/processor 240, controller/processor 280, and/or the like) the served node within a category, among a plurality of categories, based at least in part on the one or more parameters, as described above. In some aspects, the plurality of categories include at least a first category for served nodes that have a low mobility relative to the serving node and a second category for served nodes that have a high mobility relative to the serving node.

Process 600 may include additional aspects, such as any single aspect and/or any combination of aspects described below and/or in connection with one or more other processes described elsewhere herein.

In a first aspect, the one or more parameters include one or more measurements for managing one or more serving beam pair links for the served node.

In a second aspect, alone or in combination with the first aspect, the one or more measurements indicate a rate at which the one or more serving beam pair links for the served node change over time, a quantity of beam pair link candidates over which the one or more serving beam pair links for the served node change over time, or a combination thereof.

In a third aspect, alone or in combination with one or more of the first and second aspects, the one or more parameters indicate changes to one or more uplink channel measurements over time, changes to one or more downlink channel measurements over time, or a combination thereof.

In a fourth aspect, alone or in combination with one or more of the first through third aspects, the one or more parameters indicate changes to uplink receive timing over time, changes to downlink receive timing over time, or a combination thereof.

In a fifth aspect, alone or in combination with one or more of the first through fourth aspects, the one or more parameters indicate changes to a position associated with the served node relative to a position associated with the serving node over time.

In a sixth aspect, alone or in combination with one or more of the first through fifth aspects, the one or more parameters indicate a duration of time that the served node has been camped on the serving node, a rate at which the served node performs handovers to move between different serving nodes, or a combination thereof.

In a seventh aspect, alone or in combination with one or more of the first through sixth aspects, the one or more parameters comprise one or more RRM measurements that indicate relative movement of the served node with respect to one or more other nodes.

In an eighth aspect, alone or in combination with one or more of the first through seventh aspects, the wireless node comprises the served node, another node, or a central unit associated with the serving node, and process 600 includes transmitting, to a distributed unit associated with the serving node, signaling that indicates the category in which the served node is classified.

In a ninth aspect, alone or in combination with one or more of the first through eighth aspects, the signaling further indicates a confidence level associated with the classification of the served node.

In a tenth aspect, alone or in combination with one or more of the first through ninth aspects, the wireless node comprises a distributed unit associated with the serving node, and process 600 includes providing wireless service to the served node based at least in part on the category in which the served node is classified.

In an eleventh aspect, alone or in combination with one or more of the first through tenth aspects, process 600 includes receiving signaling identifying the category in which the served node is classified.

In a twelfth aspect, alone or in combination with one or more of the first through eleventh aspects, the signaling further indicates a confidence level associated with the classification of the served node.

In a thirteenth aspect, alone or in combination with one or more of the first through twelfth aspects, process 600 includes transmitting signaling that indicates the category in which the served node is classified, where the signaling further indicates a confidence level associated with the classification of the served node.

In a fourteenth aspect, alone or in combination with one or more of the first through thirteenth aspects, the serving node comprises a mobile serving node.

In a fifteenth aspect, alone or in combination with one or more of the first through fourteenth aspects, the first category for served nodes that have the low mobility relative to the serving node includes served nodes that are co-located or moving together with the serving node, and the second category for served nodes that have the high mobility relative to the serving node includes served nodes that are not co-located or are moving independently from the serving node.

Although FIG. 6 shows example blocks of process 6, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a wireless node, comprising: identifying one or more parameters indicating a mobility of a served node relative to a serving node; and classifying the served node within a category, among a plurality of categories, based at least in part on the one or more parameters, wherein the plurality of categories include at least a first category for served nodes that have a low mobility relative to the serving node and a second category for served nodes that have a high mobility relative to the serving node.

Aspect 2: The method of Aspect 1, wherein the one or more parameters include one or more measurements for managing one or more serving beam pair links for the served node.

Aspect 3: The method of Aspect 2, wherein the one or more measurements indicate a rate at which the one or more serving beam pair links for the served node change over time, a quantity of beam pair link candidates over which the one or more serving beam pair links for the served node change over time, or a combination thereof.

Aspect 4: The method of any of Aspects 1-3, wherein the one or more parameters indicate changes to one or more uplink channel measurements over time, changes to one or more downlink channel measurements over time, or a combination thereof.

Aspect 5: The method of any of Aspects 1-4, wherein the one or more parameters indicate changes to uplink receive timing over time, changes to downlink receive timing over time, or a combination thereof.

Aspect 6: The method of any of Aspects 1-5, wherein the one or more parameters indicate changes to a position associated with the served node relative to a position associated with the serving node over time.

Aspect 7: The method of any of Aspects 1-6, wherein the one or more parameters indicate a duration of time that the served node has been camped on the serving node, a rate at which the served node performs handovers to move between different serving nodes, or a combination thereof.

Aspect 8: The method of any of Aspects 1-7, wherein the one or more parameters comprise one or more RRM measurements that indicate relative movement of the served node with respect to one or more other nodes.

Aspect 9: The method of any of Aspects 1-8, wherein the wireless node comprises the served node, another node, or a CU associated with the serving node, and wherein the method further comprises: transmitting, to a DU associated with the serving node, signaling that indicates the category in which the served node is classified.

Aspect 10: The method of Aspect 9, wherein the signaling further indicates a confidence level associated with the classification of the served node.

Aspect 11: The method of any of Aspects 1-8, wherein the wireless node comprises a DU associated with the serving node, and wherein the method further comprises: providing wireless service to the served node based at least in part on the category in which the served node is classified.

Aspect 12: The method of Aspect 11, further comprising: receiving signaling identifying the category in which the served node is classified.

Aspect 13: The method of Aspect 12, wherein the signaling further indicates a confidence level associated with the classification of the served node.

Aspect 14: The method of Aspect 11, further comprising: transmitting signaling that indicates the category in which the served node is classified, wherein the signaling further indicates a confidence level associated with the classification of the served node.

Aspect 15: The method of any of Aspects 1-14, wherein the serving node comprises a mobile serving node.

Aspect 16: The method of any of Aspects 1-15, wherein the first category for served nodes that have the low mobility relative to the serving node includes served nodes that are co-located or moving together with the serving node, and wherein the second category for served nodes that have the high mobility relative to the serving node includes served nodes that are not co-located or are moving independently from the serving node.

Aspect 17: An apparatus for wireless communication at a device, comprising a processor; memory coupled with the processor; and instructions stored in the memory and executable by the processor to cause the apparatus to perform the method of any of Aspects 1-16.

Aspect 18: A device for wireless communication, comprising a memory and one or more processors coupled to the memory, the memory and the one or more processors configured to perform the method of any of Aspects 1-16.

Aspect 19: An apparatus for wireless communication, comprising at least one means for performing the method of any of Aspects 1-16.

Aspect 20: A non-transitory computer-readable medium storing code for wireless communication, the code comprising instructions executable by a processor to perform the method of any of Aspects 1-16.

Aspect 21: A non-transitory computer-readable medium storing a set of instructions for wireless communication, the set of instructions comprising one or more instructions that, when executed by one or more processors of a device, cause the device to perform the method of any of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless integrated access and backhaul (IAB) node, comprising:
   identifying one or more parameters indicating a mobility of a served IAB node relative to a serving IAB node, wherein the served IAB node comprises a mobile terminal (MT) of a child IAB node, and wherein the serving IAB node comprises a distributed unit (DU) of an IAB donor node;
   classifying the served IAB node within a category, among a plurality of categories, based at least in part on the one or more parameters, wherein the plurality of categories include at least a first category for served IAB nodes that have a low mobility relative to the serving IAB node and a second category for served IAB nodes that have a high mobility relative to the serving IAB node, wherein one of the one or more parameters comprises a duration of time that the served IAB node has been camped on the serving IAB node; and providing wireless service to the served IAB node based at least in part on the category in which the served IAB node is classified.

2. The method of claim 1, wherein the one or more parameters include one or more measurements for managing one or more serving beam pair links for the served IAB node.

3. The method of claim 2, wherein the one or more measurements indicate a rate at which the one or more serving beam pair links for the served IAB node change over time, a quantity of beam pair link candidates over which the one or more serving beam pair links for the served IAB node change over time, or a combination thereof.

4. The method of claim 1, wherein the one or more parameters indicate changes to one or more uplink channel measurements over time, changes to one or more downlink channel measurements over time, or a combination thereof.

5. The method of claim 1, wherein the one or more parameters indicate changes to uplink receive timing over time, changes to downlink receive timing over time, or a combination thereof.

6. The method of claim 1, wherein the one or more parameters indicate changes to a position associated with the served IAB node relative to a position associated with the serving IAB node over time.

7. The method of claim 1, wherein the one or more parameters indicate a rate at which the served IAB node performs handovers to move between different serving IAB nodes.

8. The method of claim 1, wherein the one or more parameters comprise one or more radio resource management measurements that indicate relative movement of the served IAB node with respect to one or more other IAB nodes.

9. The method of claim 1, wherein the wireless IAB node comprises the served IAB node, another IAB node, or a central unit associated with the serving IAB node, and wherein the method further comprises:

transmitting, to the DU of the IAB donor node, associated with the serving IAB node, signaling that indicates the category in which the served IAB node is classified.

10. The method of claim 9, wherein the signaling further indicates a confidence level associated with the classification of the served IAB node.

11. The method of claim 1, further comprising:
receiving signaling identifying the category in which the served IAB node is classified.

12. The method of claim 11, wherein the signaling further indicates a confidence level associated with the classification of the served IAB node.

13. The method of claim 1, further comprising:
transmitting signaling that indicates the category in which the served IAB node is classified, wherein the signaling further indicates a confidence level associated with the classification of the served IAB node.

14. The method of claim 1, wherein the serving IAB node comprises a mobile serving IAB node.

15. The method of claim 1, wherein the first category for served IAB nodes that have the low mobility relative to the serving IAB node includes served IAB nodes that are co-located or moving together with the serving IAB node, and wherein the second category for served IAB nodes that have the high mobility relative to the serving IAB node includes served IAB nodes that are not co-located or are moving independently from the serving IAB node.

16. The method of claim 1, wherein the providing the wireless service further comprises:
prioritizing wireless service to the served IAB node based at least in part on the served IAB node being classified in the first category for served IAB nodes that have a low mobility relative to the serving IAB node.

17. The method of claim 1, wherein the providing the wireless service further comprises:
including a quantity of demodulation reference signals in uplink and downlink communications to the served IAB node based at least in part on the served IAB node being classified in the second category for served IAB nodes that have a high mobility relative to the serving IAB node.

18. A wireless integrated access and backhaul (IAB) node for wireless communication, comprising:
one or more memories; and
one or more processors, coupled to the one or more memories, configured to:
identify one or more parameters indicating a mobility of a served IAB node relative to a serving IAB node, wherein the served IAB node comprises a mobile terminal (MT) of a child IAB node, and wherein the serving IAB node comprises a distributed unit (DU) of an IAB donor node;
classify the served IAB node within a category, among a plurality of categories, based at least in part on the one or more parameters, wherein the plurality of categories include at least a first category for served IAB nodes that have a low mobility relative to the serving IAB node and a second category for served IAB nodes that have a high mobility relative to the serving IAB node, wherein one of the one or more parameters comprises a duration of time that the served IAB node has been camped on the serving IAB node; and
provide wireless service to the served IAB node based at least in part on the category in which the served IAB node is classified.

19. The wireless IAB node of claim 18, wherein the one or more parameters include one or more measurements for managing one or more serving beam pair links for the served IAB node.

20. The wireless IAB node of claim 19, wherein the one or more measurements indicate a rate at which the one or more serving beam pair links for the served IAB node change over time, a quantity of beam pair link candidates over which the one or more serving beam pair links for the served IAB node change over time, or a combination thereof.

21. The wireless IAB node of claim 18, wherein the one or more parameters indicate changes to one or more uplink channel measurements over time, changes to one or more downlink channel measurements over time, changes to uplink receive timing over time, changes to downlink receive timing over time, or a combination thereof.

22. The wireless IAB node of claim 18, wherein the one or more parameters indicate changes to a position associated with the served IAB node relative to a position associated with the serving IAB node over time.

23. The wireless IAB node of claim 18, wherein the one or more parameters indicate a rate at which the served IAB node performs handovers to move between different serving IAB nodes, or a combination thereof.

24. The wireless IAB node of claim 18, wherein the one or more parameters comprise one or more radio resource management measurements that indicate relative movement of the served IAB node with respect to one or more other IAB nodes.

25. The wireless IAB node of claim 18, wherein the wireless IAB node comprises the served IAB node, another IAB node, or a central unit associated with the serving IAB node, and wherein the one or more processors are further configured to:
  transmit, to a distributed unit associated with the serving IAB node, signaling that indicates the category in which the served IAB node is classified.

26. The wireless IAB node of claim 18, wherein the one or more processors are further configured to:
  receive signaling identifying the category in which the served IAB node is classified.

27. The wireless IAB node of claim 18, wherein the one or more processors are further configured to:
  transmit signaling that indicates the category in which the served IAB node is classified, wherein the signaling further indicates a confidence level associated with the classification of the served IAB node.

28. The wireless IAB node of claim 18, wherein the first category for served IAB nodes that have the low mobility relative to the serving IAB node includes served nodes that are co-located or moving together with the serving IAB node, and wherein the second category for served IAB nodes that have the high mobility relative to the serving IAB node includes served IAB nodes that are not co-located or are moving independently from the serving IAB node.

29. A non-transitory computer-readable medium storing one or more instructions for wireless communication, the one or more instructions comprising:
  one or more instructions that, when executed by one or more processors of a wireless integrated access and backhaul (IAB) node, cause the one or more processors to:
    identify one or more parameters indicating a mobility of a served IAB node relative to a serving IAB node, wherein the served IAB node comprises a mobile terminal (MT) of a child IAB node, and wherein the serving IAB node comprises a distributed unit (DU) of an IAB donor node;
    classify the served IAB node within a category, among a plurality of categories, based at least in part on the one or more parameters, wherein the plurality of categories include at least a first category for served IAB nodes that have a low mobility relative to the serving IAB node and a second category for served IAB nodes that have a high mobility relative to the serving IAB node, wherein one of the one or more parameters comprises a duration of time that the served IAB node has been camped on the serving IAB node; and
    provide wireless service to the served IAB node based at least in part on the category in which the served IAB node is classified.

30. An apparatus for wireless communication, comprising:
  means for identifying one or more parameters indicating a mobility of a served integrated access and backhaul (IAB) node relative to a serving IAB node, wherein the served IAB node comprises a mobile terminal (MT) of a child IAB node, and wherein the serving IAB node comprises a distributed unit (DU) of an IAB donor node;
  means for classifying the served IAB node within a category, among a plurality of categories, based at least in part on the one or more parameters, wherein the plurality of categories include at least a first category for served IAB nodes that have a low mobility relative to the serving IAB node and a second category for served IAB nodes that have a high mobility relative to the serving IAB node, wherein one of the one or more parameters comprises a duration of time that the served IAB node has been camped on the serving IAB node; and
  means for providing wireless service to the served IAB node based at least in part on the category in which the served IAB node is classified.

* * * * *